W. BUTTERS.
PHOTOGRAPHIC VIGNETTING MACHINE.
APPLICATION FILED DEC. 23, 1908.
964,085.
Patented July 12, 1910.
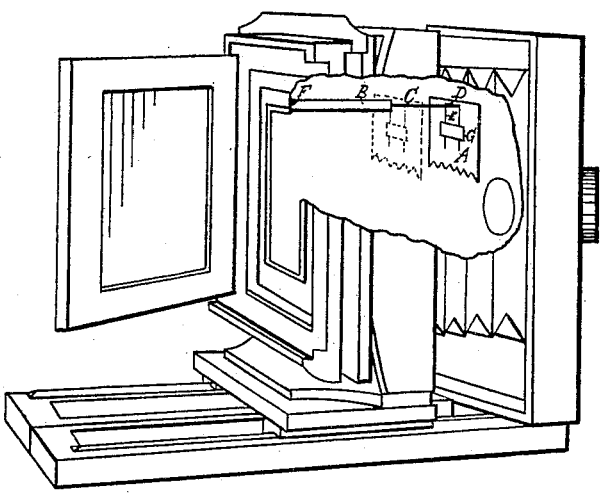
Fig. 3.
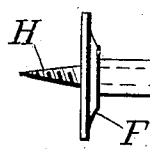
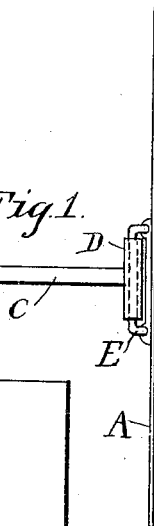
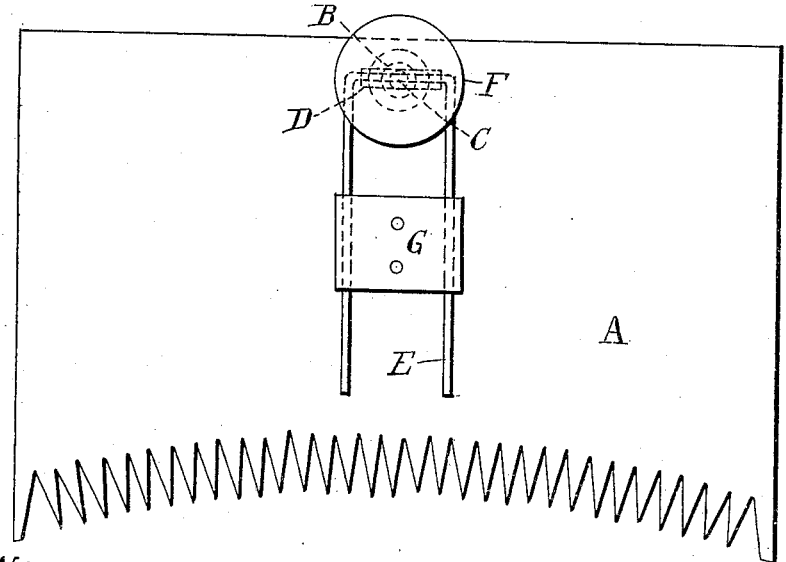
Witnesses
Inventor
William Butters

UNITED STATES PATENT OFFICE.

WILLIAM BUTTERS, OF BENTON, WISCONSIN.

PHOTOGRAPHIC VIGNETTING-MACHINE.

964,085. Specification of Letters Patent. Patented July 12, 1910.

Application filed December 23, 1908. Serial No. 469,012.

*To all whom it may concern:*

Be it known that I, WILLIAM BUTTERS, a citizen of the United States, residing at Benton, in the county of Lafayette and State of Wisconsin, have invented a new and useful Photographic Vignetting-Machine, of which the following is a specification.

My invention relates to improvements in photographic vignetting machines for portrait cameras by which the vignetting is made on the negative at the time of exposing the plate to the subject, and the objects of my invention are, first, to provide a simple adjustable support for the vignetting plate, and, second, to afford facilities for adjusting the position of the vignetting plate for correct blending with either long or short focal length lenses. I attain these objects by the mechanism illustrated in the drawings, in which—

Figure 1, is a top view of the machine; Fig. 2, an end view of the machine; and Fig. 3, is a view in perspective of a portrait camera, part of which is cut away to show the application of my invention.

Similar letters refer to similar parts throughout the several views.

The base foot F, and its screw H, and the hollow rod B, form the support of the adjustable rod C. In the hollow rod B, slides the rod C, carrying the hinge D, with its adjusting pin E, on which the vignetting plate A, is carried on a sliding clamp G. The base F, carrying the hollow rod B, is attached to the interior wood work of the portrait camera either by the screw F, or other suitable arrangement, the rod C, with a hinge D, and the adjusting pin E, carrying the vignetting plate A, slides in the hollow rod B, to adjust the vignetting plate A, to the proper position between the lens and the photographic plate to produce the blending effect on the negative between that part of the portrait left on the negative, and the part to be blended out. The vignetting plate A, with its clamp G, slides perpendicularly on the adjusting pin E, of the hinge D, to regulate the amount blended out of the negative. The vignetting plate A, swings on a hinge D, by the adjusting pin E, to a horizontal position (held there by spring friction) which permits the camera to be used without vignetting the negative. The vignetting plate A, forms no part of my invention.

I am aware that prior to my invention, photographic vignetting machines were made with a single opaque plate with a concave serrate edge, to be interposed between the subject and the lens, for the purpose of vignetting the negative in conjunction with the exposure making the image on the negative, and also an expanding and contracting vignetter with pivoted points adjusting around a circular opening placed rigidly in a permanent position in the interior of a camera, I therefore do not claim such a combination broadly; but

I claim:

The combination in a photographic vignetting machine, of a base F, with a hollow rod B, and a sliding rod C, having a hinge D, with an adjusting pin E, and a sliding clamp G, attached to the vignetting plate A, all substantially as set forth.

WILLIAM BUTTERS.

Witnesses:
 J. E. OTIS,
 W. B. VAIL.